(12) United States Patent
Fiebrich et al.

(10) Patent No.: US 12,142,961 B2
(45) Date of Patent: *Nov. 12, 2024

(54) DEVICE CHARGING SYSTEM

(71) Applicant: Dell Products L.P., Round Rock, TX (US)

(72) Inventors: Greg R. Fiebrich, Georgetown, TX (US); Douglas Messick, Austin, TX (US); Kyle Cross, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/479,666

(22) Filed: Sep. 20, 2021

(65) Prior Publication Data

US 2022/0006318 A1 Jan. 6, 2022

Related U.S. Application Data

(63) Continuation of application No. 14/842,459, filed on Sep. 1, 2015, now Pat. No. 11,146,095, which is a
(Continued)

(51) Int. Cl.
*H02J 7/34* (2006.01)
*G06F 1/26* (2006.01)
*G06F 1/3203* (2019.01)

(52) U.S. Cl.
CPC .............. *H02J 7/342* (2020.01); *G06F 1/266* (2013.01); *G06F 1/3203* (2013.01)

(58) Field of Classification Search
CPC ......... G06F 1/266; G06F 1/3203; H02J 7/342
(Continued)

(56) References Cited

U.S. PATENT DOCUMENTS 4,126,765 A 11/1978 Calder et al.
4,583,034 A 4/1986 Martin
(Continued)

FOREIGN PATENT DOCUMENTS

JP 01085539 A 3/1989
JP 04150625 A 5/1992
(Continued)

OTHER PUBLICATIONS

Benini, L.; Macii, A.; Macii, E.; Poncino, M.; Scarsi, R.; "Scheduling battery usage in mobile systems," Very Large Scale Integration (VLSI) Systems, IEEE Transactions on, vol. 11, No. 6, pp. 1136-1143, Dec. 2003.
(Continued)

*Primary Examiner* — Faisal M Zaman
(74) *Attorney, Agent, or Firm* — Joseph Mencher

(57) ABSTRACT

Optimized bus powered peripheral battery charging includes a circuit to initiate a change in an advanced configuration and power interface (ACPI) state in a controller allowing charging of a peripheral device battery, the circuit including a signal converter coupled between an input port and the controller to sense when a the peripheral device battery is coupled to an input port and to restrict the controller from changing ACPI state multiple times for a given peripheral device battery coupling; and a ground loop detector coupled in parallel to the signal converter between the input port and the controller to allow the controller to know that the peripheral device battery has maintained being coupled to the input port.

20 Claims, 2 Drawing Sheets

Related U.S. Application Data continuation of application No. 13/223,871, filed on Sep. 1, 2011, now Pat. No. 9,128,706, which is a continuation of application No. 12/110,766, filed on Apr. 28, 2008, now Pat. No. 8,037,331.

(58) Field of Classification Search
USPC .......................................... 710/15, 302, 304
See application file for complete search history.

(56) References Cited

U.S. PATENT DOCUMENTS

| | | | |
|---|---|---|---|
| 5,153,558 A | 10/1992 | Robinson et al. | |
| 5,621,250 A | 4/1997 | Kim | |
| 5,650,669 A | 7/1997 | Aldous | |
| 5,781,744 A * | 7/1998 | Johnson | G06F 13/4081 |
| | | | 710/15 |
| 5,818,201 A | 10/1998 | Stockstad et al. | |
| 5,970,428 A | 10/1999 | Brennan | |
| 6,189,108 B1 | 2/2001 | Cromer et al. | |
| 6,191,552 B1 | 2/2001 | Kates et al. | |
| 6,222,347 B1 | 4/2001 | Gong | |
| 6,266,776 B1 | 7/2001 | Sakai | |
| 6,331,744 B1 | 12/2001 | Chen et al. | |
| 6,380,714 B1 | 4/2002 | Chou | |
| 6,456,035 B1 | 9/2002 | Crisp et al. | |
| 6,516,418 B1 * | 2/2003 | Lee | G06F 1/3203 |
| | | | 713/320 |
| 6,523,122 B1 | 2/2003 | Moon | |
| 6,774,604 B2 | 8/2004 | Matsuda et al. | |
| 6,782,491 B1 | 8/2004 | Foedlmeier et al. | |
| 6,820,206 B1 | 11/2004 | Kim et al. | |
| 6,895,516 B2 | 5/2005 | Odaohhara | |
| 6,928,562 B2 | 8/2005 | Cohen et al. | |
| 6,946,817 B2 | 9/2005 | Fischer et al. | |
| 7,058,832 B2 | 6/2006 | Sachs | |
| 7,082,543 B2 | 7/2006 | Lin | |
| 7,170,259 B2 | 1/2007 | Veselic | |
| 7,171,569 B2 | 1/2007 | Ohishi et al. | |
| 7,240,227 B2 | 7/2007 | Maezawa | |
| 7,296,164 B2 | 11/2007 | Breen et al. | |
| 7,296,171 B2 | 11/2007 | Hahn et al. | |
| 7,321,974 B2 | 1/2008 | Anderson et al. | |
| 7,437,578 B2 | 10/2008 | Menzl | |
| 7,437,586 B2 | 10/2008 | Cornelius | |
| 7,451,328 B2 * | 11/2008 | Hsieh | G06F 1/1601 |
| | | | 713/320 |
| 7,495,413 B2 | 2/2009 | Vaisnys et al. | |
| 7,570,015 B2 | 8/2009 | Bansal et al. | |
| 7,631,205 B2 | 12/2009 | Sakemoto et al. | |
| 7,689,851 B2 | 3/2010 | Sawyers et al. | |
| 7,791,319 B2 | 9/2010 | Veselic et al. | |
| 7,793,115 B2 | 9/2010 | Tipley et al. | |
| 7,908,414 B2 | 3/2011 | Combs et al. | |
| 8,037,331 B2 * | 10/2011 | Fiebrich | G06F 1/3203 |
| | | | 713/320 |
| 8,375,234 B2 | 2/2013 | Schramm et al. | |
| 8,638,071 B2 * | 1/2014 | Mizuno | H02J 7/007182 |
| | | | 320/162 |
| 9,128,706 B2 * | 9/2015 | Fiebrich | G06F 1/266 |
| 11,146,095 B2 * | 10/2021 | Fiebrich | H02J 7/342 |
| 2002/0011823 A1 | 1/2002 | Lee | |
| 2002/0157039 A1 | 10/2002 | Ihara | |
| 2002/0162036 A1 | 10/2002 | Kim et al. | |
| 2002/0169915 A1 * | 11/2002 | Wu | G06F 13/4081 |
| | | | 710/305 |
| 2003/0030412 A1 | 2/2003 | Matsuda et al. | |
| 2003/0033098 A1 | 2/2003 | Rakshani et al. | |
| 2003/0050102 A1 | 3/2003 | Roh | |
| 2003/0054703 A1 | 3/2003 | Fischer et al. | |
| 2003/0159076 A1 | 8/2003 | Delisle et al. | |
| 2003/0221135 A1 | 11/2003 | Motoe et al. | |
| 2004/0063464 A1 | 4/2004 | Akram et al. | |
| 2004/0148531 A1 * | 7/2004 | Yamazaki | G06F 1/26 |
| | | | 713/300 |
| 2004/0158751 A1 | 8/2004 | Lam et al. | |
| 2004/0187042 A1 | 9/2004 | Kawanabe | |
| 2005/0134321 A1 | 6/2005 | Ede | |
| 2005/0138239 A1 | 6/2005 | Kasahara | |
| 2005/0162132 A1 | 7/2005 | Nagasawa | |
| 2005/0174094 A1 * | 8/2005 | Purdy | H02J 7/00 |
| | | | 320/134 |
| 2005/0194928 A1 | 9/2005 | Hou | |
| 2006/0035527 A1 * | 2/2006 | Numano | G06F 1/266 |
| | | | 439/668 |
| 2006/0061332 A1 | 3/2006 | Neu et al. | |
| 2006/0085659 A1 | 4/2006 | Nishinaga et al. | |
| 2006/0117195 A1 | 6/2006 | Niwa et al. | |
| 2006/0136646 A1 | 6/2006 | Do et al. | |
| 2006/0145659 A1 | 7/2006 | Patino et al. | |
| 2006/0176017 A1 | 8/2006 | Waguespack | |
| 2006/0192015 A1 | 8/2006 | DiGiovanna | |
| 2006/0226805 A1 | 10/2006 | Yu | |
| 2006/0271802 A1 | 11/2006 | Yanagawa | |
| 2007/0067659 A1 * | 3/2007 | Tevanian | G06F 1/3215 |
| | | | 713/324 |
| 2007/0101172 A1 | 5/2007 | Ohyama | |
| 2007/0124604 A1 | 5/2007 | Feldstein et al. | |
| 2007/0220290 A1 * | 9/2007 | Tsai | G06F 1/266 |
| | | | 713/300 |
| 2007/0241990 A1 * | 10/2007 | Smith | G09G 5/003 |
| | | | 345/5 |
| 2008/0106232 A1 | 5/2008 | Idzik et al. | |
| 2008/0166968 A1 * | 7/2008 | Tang | H04W 99/00 |
| | | | 455/41.2 |
| 2008/0185990 A1 | 8/2008 | Hsu | |
| 2008/0224669 A1 | 9/2008 | Nishida | |
| 2008/0229121 A1 | 9/2008 | Lassa et al. | |
| 2008/0253556 A1 | 10/2008 | Cobb et al. | |
| 2008/0270809 A1 * | 10/2008 | Hoffer | G06F 1/3253 |
| | | | 713/300 |
| 2008/0294923 A1 | 11/2008 | Barake et al. | |
| 2009/0055666 A1 * | 2/2009 | Yee | H04L 41/0833 |
| | | | 713/320 |
| 2009/0156199 A1 | 6/2009 | Steenstra et al. | |
| 2009/0200982 A1 | 8/2009 | Hurtz | |
| 2009/0217065 A1 | 8/2009 | Araujo, Jr. | |
| 2009/0271644 A1 | 10/2009 | Fiebrich et al. | |
| 2010/0027049 A1 | 2/2010 | Seignol et al. | |
| 2010/0033018 A1 | 2/2010 | Fukasawa et al. | |
| 2010/0100752 A1 | 4/2010 | Chueh et al. | |
| 2010/0128632 A1 | 5/2010 | Mantysalo | |
| 2010/0281183 A1 | 11/2010 | Van Bebber | |
| 2012/0005502 A1 | 1/2012 | Fiebrich et al. | |

FOREIGN PATENT DOCUMENTS

| | | |
|---|---|---|
| JP | 2000165478 A | 6/2000 |
| JP | 2000278948 A | 10/2000 |
| JP | 2005005009 A | 1/2005 |
| JP | 2006187113 A | 7/2006 |
| JP | 2008278570 A | 11/2008 |

OTHER PUBLICATIONS

Buennemeyer, T.K.; Nelson, T.M.; Marchany, R.C.; Tront, J.G.; "Polling the smart battery for efficiency: Lifetime optimization in battery-sensing intrusion protection systems," SoutheastCon, 2007. Proceedings. IEEE, pp. 740-745, Mar. 22-25, 2007.

Kularatna, N.; "Rechargeable batteries and their management," Instrumentation & Measurement Magazine, IEEE, vol. 14, No. 2, pp. 20-23, Apr. 2011.

Ying-Wen Bai; Hsiu-Chen Chen;, "Design and Implementation of Low-Power Tablet PCs, " Sep. 11, 2006, Consumer Electronics, 2006. ISCE '06. 2006 IEEE Tenth International Symposium on, pp. 1-6.

* cited by examiner

DEVICE CHARGING SYSTEM

CROSS REFERENCE TO RELATED APPLICATIONS

The present application is a continuation of U.S. patent application Ser. No. 14/842,459, filed Sep. 1, 2015, which is a continuation of U.S. patent application Ser. No. 13/223,871, filed Sep. 1, 2011, now U.S. Pat. No. 9,128,706, which is a continuation of U.S. patent application Ser. No. 12/110,766, filed Apr. 28, 2008, now U.S. Pat. No. 8,037,331, the disclosures of which are incorporated herein by reference in their entirety.

BACKGROUND

The present disclosure relates generally to information handling systems, and more particularly to an energy efficient method to wake a host system for charging battery powered portable devices via bus powered external i/o ports.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

With the proliferation of small, battery powered electronic peripheral devices, such as digital cameras, music players, mobile telephones, and a variety of other small electronic devices, there is a need for recharging the batteries for these devices. One way to recharge the batteries of these devices may be to charge the batteries from a larger capacity battery, such as the battery for a portable or notebook-type IHS. Typically, when the IHS is not being used, or is not plugged in to a power source, the IHS is put into an advanced configuration and power interface (ACPI) deep sleep mode known as G3. This time of non-use for the IHS may be when the user wishes to charge the batteries of the peripheral device. In order to support charging the peripheral device, the IHS should wake to ACPI S5. This can be a large drain on the IHS battery and therefore, an efficient system and method for waking the IHS from the G3 mode and maintaining long battery life is desirable.

Accordingly, it would be desirable to provide an energy efficient method to wake a host system for charging battery powered portable devices via bus powered external i/o ports.

SUMMARY

According to one embodiment, optimized bus powered peripheral battery charging includes a circuit to initiate a change in an advanced configuration and power interface (ACPI) state in a controller allowing charging of a peripheral device battery, the circuit including a signal converter coupled between an input port and the controller to sense when the peripheral device battery is coupled to an input port and to restrict the controller from changing ACPI state multiple times for a given peripheral device battery coupling; and a ground loop detector coupled in parallel to the signal converter between the input port and the controller to allow the controller to know that the peripheral device battery has maintained being coupled to the input port.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
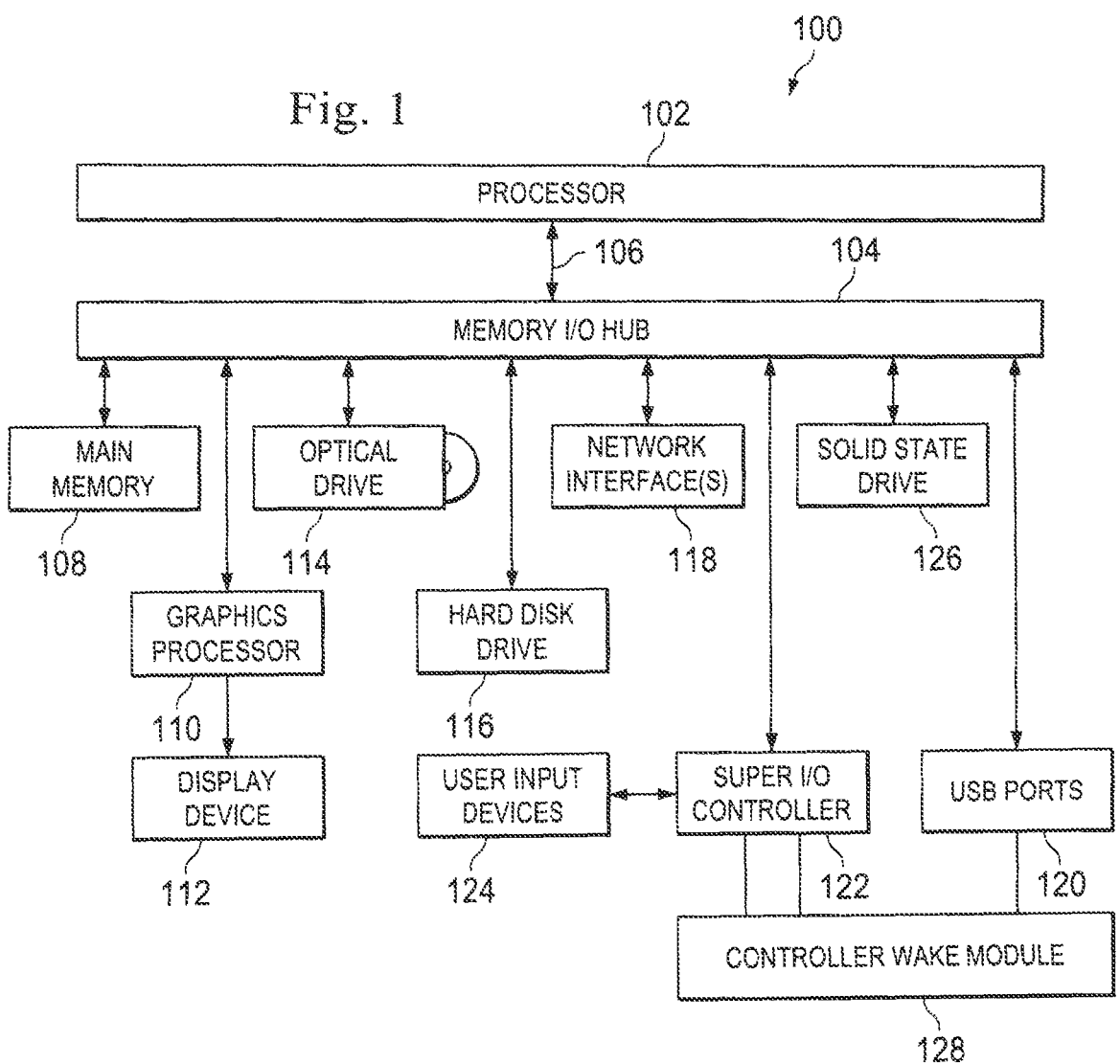
FIG. 1 illustrates an embodiment of an information handling system (IHS).

FIG. 1 is a block diagram of one IHS 100. The IHS 100 includes a processor 102 such as an Intel Pentium TM series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Also shown in FIG. 1 is a controller wake module 128 coupled between the controller 122 and the port 120. Operation and configuration of an embodiment of the wake module 128 are discussed in more detail below with respect to FIGS. 2-3.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

An IHS 100 may allow charging of a peripheral device battery via a USB port 120 when the IHS 100 system is in what is commonly known in the art as an Advanced Configuration and Power Interface (ACPI) S5 power state. ACPI power states are generally known as an open industry standard allowing a combination of operating system (OS) control and/or basic input output system (BIOS) control of power management for the IHS 100. The ACPI states allow the IHS 100 to adjust to higher or lower performance states depending on system demand. Using the ACPI states, the IHS 100 may be put into extremely low power consumption states. From these states, the controller 122 and/or the IHS 100 may be quickly awakened by general purpose events, such as, interrupts, the clock, the keyboard, a modem, and/or a variety of other events. When a notebook-type IHS 100 is powered off, with only battery power inserted, (e.g., not plugged in) the IHS 100 may be set to the ACPI G3 power state, which consumes almost no power, and thus maintains a long battery life. However, supporting the USB charging feature on an IHS 100 poses a problem of how to wake from ACPI G3 state to ACPI S5 state to allow charging of the peripheral device battery and how to best manage the power states to maximize battery life. It should be understood that any state change may be utilized with the present disclosure.

In an embodiment, a peripheral device battery may be charged via the USB port 120 while the IHS 100 is in ACPI S5 state. A controller 122 (e.g., an embedded controller) in the IHS 100 may "wake-up" via power switch inputs, when a user presses the power switch button, but previous disclosures for this are limited to waking up the controller 122 and then allowing the controller 122 to decide if the IHS 100 system should wake up. In addition, using a power switch input that is connected directly to a connector ground loop detection circuit can cause a large drain on a coin cell battery or other power source used to power the ACPI G3 circuitry in the controller 122. Thus, there is no previous system and method defined for a device that uses a connector detect to wake the system, such as the USB connector port 120.

Figure 2:
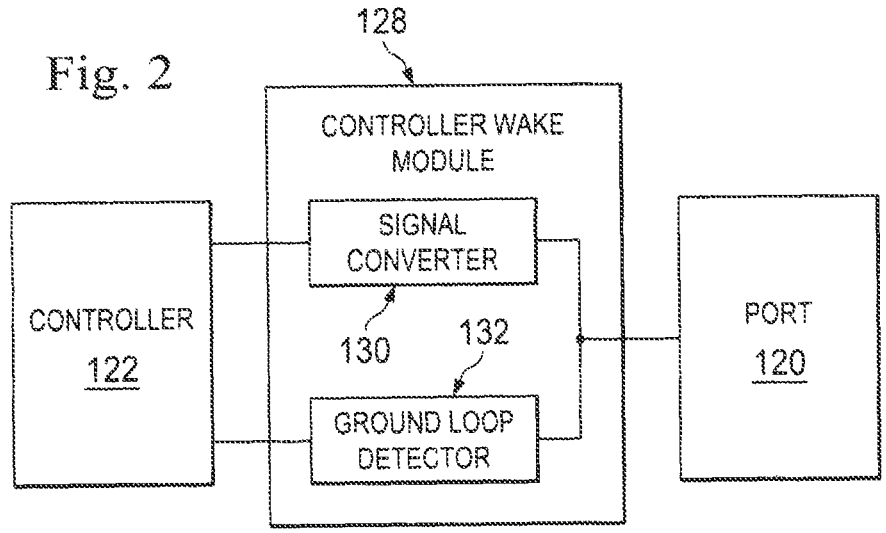
FIG. 2 illustrates a block diagram of an embodiment of a controller wake module to wake a controller from a sleep mode.

FIG. 2 illustrates a block diagram of an embodiment of a controller wake module 128 to wake the controller 122 from a sleep mode, such as ACPI G3 state. In an embodiment, the controller wake module 128 comprises a signal converter 130 and a ground loop detector, in parallel, between the controller 122 and the port 120.

Figure 3:
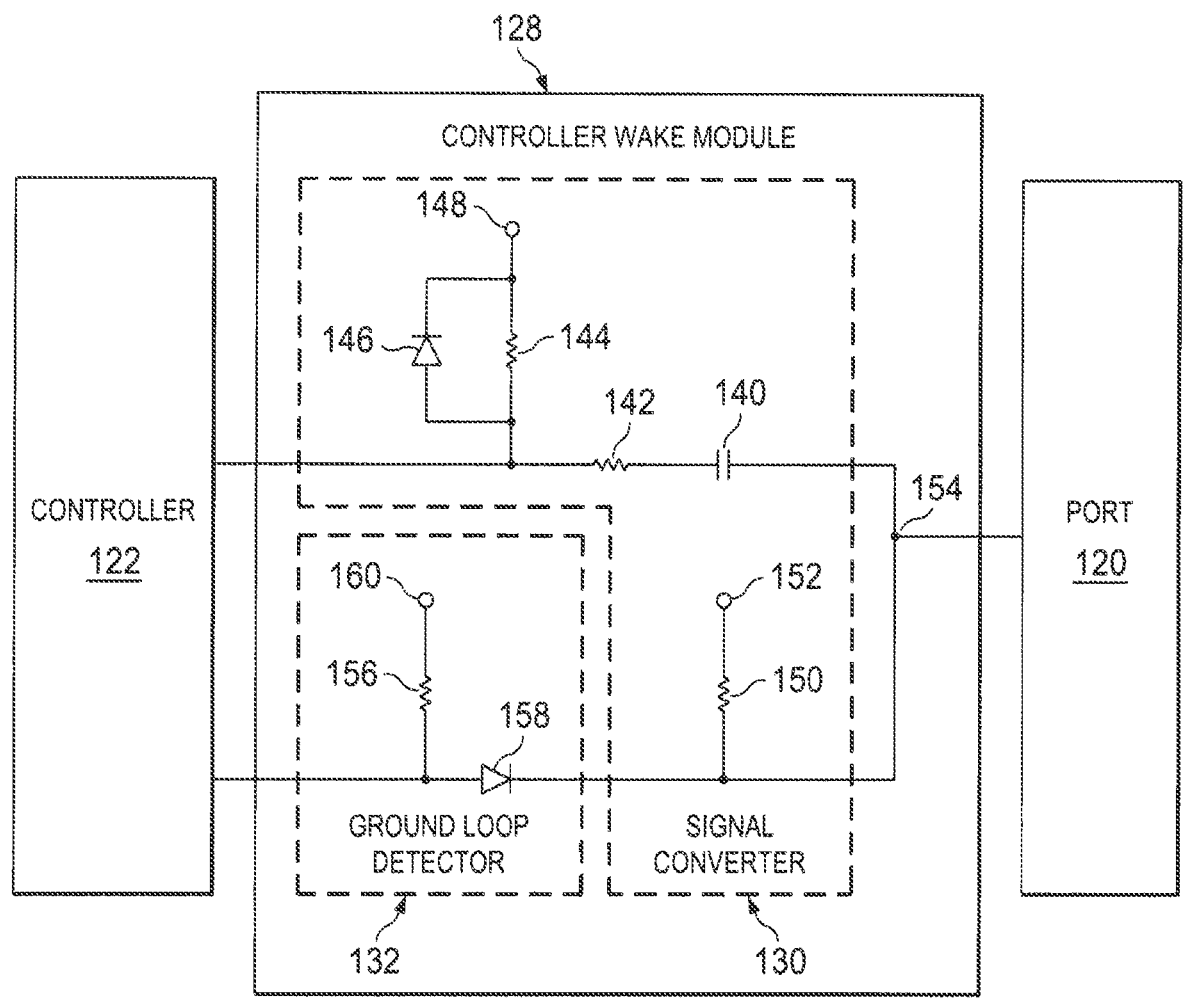
FIG. 3 illustrates a schematic diagram of an embodiment of the controller wake module of FIG. 2.

FIG. 3 illustrates a schematic diagram of an embodiment of the controller wake module 128 of FIG. 2. In this embodiment, the signal converter 130 includes a blocking capacitor 140, resistors 142, 144, and 150 and diode 146. Resistor 142 is coupled between the capacitor 140 and the controller 122. Resistor 144 and diode 146 are coupled between node 148 and the controller 122. Resistor 150 is coupled between node 152 and node 154. In an embodiment, nodes 148 and 152 are coupled to a first power rail, such as a G3 power rail. In this embodiment, the ground loop detector 132 includes a resistor 156 and a diode 158. The resistor 156 is coupled between node 160 and the controller 122. The diode 158 is coupled between the node 154 and the controller 122. In an embodiment, the node 160 is coupled to a second power rail, such as an S5 power rail. It is to be noted that diodes 146 and 158 are optional and may be removed from the system (e.g., the diode 158 may be included to prevent electrical shorts from the G3 power rail to the S5 power rail).

The signal converter 130 generally enables the controller 122 to monitor the port 120 (e.g., a USB port) for device insertion (e.g., for charging a peripheral device battery) by transforming a high to low DC transition, seen upon insertion to the port 120 into high to low pulse of limited duration so that the controller 122 can recognize the signal through an input, such as, a power switch input on the controller 122, as a valid power switch input assertion according to its specifications while ensuring that the controller 122 is not damaged. The ground loop detector 132 generally enables the controller to monitor the port 120 during ACPI S5, when the controller logic is operational, for example through a general purpose input on the controller 122 because the signal converter 130 limits the power switch input from being used to do so.

During operation of an embodiment as illustrated in FIG. 3, before a device is plugged into the port 120, the system is in a G3 state and the electrical charge on either side of the capacitor 140 is held high. Upon insertion of a device into the port 120, a detect switch in the port 120 is grounded, which results in a falling edge signal. The capacitor 140 in the signal converter converts that falling edge into a signal that the controller 122 can recognize, a high to low pulse of limited duration, (and that will not damage the EC), and that signal is used to awaken the controller 122. The controller 122 then changes the system ACPI state from G3 to S5 and turns on power to port 120 to allow the device that is plugged into the port 120 to be charged through that port 120.

The components of the signal converter 130 (capacitor 140 and resistors 142, 144, and 150) may be chosen to "tune" the signal converter such that the signal it provides to the controller will allow the controller to recognize a single insertion event into port 120 while the system is in a G3 state.

The circuit allows the controller 122 to wake the system from G3 in order to charge a peripheral device from the USB Port in S5 with no other power rails turned on. As is standard in the industry, the charging signal to charge the peripheral device via the port 120 controls a charging power source (not shown). After the falling edge has been converted to the signal that wakes the controller 122, the capacitor 140 charges back up on the side opposite the port 120 such that the power switch input on the controller 122 is held high. This limits the Controller 122 from waking more than once from a given insertion of a device in the port 120. This may be a problem which occurs if the capacitor 140 is not in the circuit. When the device is removed from the port 120, the capacitor 140 quickly discharges until the charge on both sides of the capacitor 140 are again held high such that another device insertion in the USB Port causing another falling edge will wake the controller 122 (e.g., the system is again "armed".)

In an embodiment of the present disclosure, a DC blocking capacitor 140 is used to transform the falling edge on the controller 122 power switch input that is caused by a USB connector insertion to the port 120. The falling edge should be sufficiently long to wake the controller 122 once, but after that time the capacitor 140 will begin charging back up to hold the power switch input high. This will prevent the controller 140 from waking more than once from a given insertion of a USB device, and will thus save battery life and prevent hysteresis behavior. When the USB connector is removed, the capacitor 140 will discharge, and the power switch will once again be "armed" to wake the system. In an embodiment, a run-time (S5 or greater) general purpose input (GPI) on the controller 122 will also be connected to the USB connector ground loop detector 132 in parallel. This input will allow the controller 122 to know at run time (S5 or greater) that a device is still connected, because the DC blocking capacitor 140 will prevent the power switch input from being used for this purpose. Thus, the GPI may enable code to allow different behaviors for AC vs. battery power, allow more complicated watchdog timer decision trees, power down as soon as a device is disconnected, and a variety of other features. In another embodiment, the GPI may allow the controller 122 to set a timer that may automatically return the system to fully off (ACPI G3). This may be very useful because the DC blocking capacitor 140 can prevent further wake events via the power switch input of the controller 122.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for charging a device battery, comprising:
configuring, by a controller in a computing device that includes a charging battery coupled to a power rail in the computing device, a system power state of the computing device in a sleep state in which power is not supplied from the charging battery through the power rail to a plurality of components in the computing device;
monitoring, by the controller while the system power state of the computing device is configured in the sleep state, for the coupling of a device battery to an input port that is included in the plurality of components;
detecting, by the controller, the coupling of the device battery to the input port while the system power state of the computing device is configured in the sleep state such that the input port is not being supplied power from the device battery; and
waking, by the controller in response to detecting the coupling of the device battery to the input port, the computing device from the sleep state to change the system power state of the computing device in order to causes power from the charging battery to be provided via the power rail to the input port to charge the device battery.

2. The method of claim 1, further comprising:
detecting, by the controller, that the device battery has been decoupled from the input port; and
preventing, by the controller in response to detecting that the device battery has been decoupled from the input port, power from the charging battery from being provided via the power rail to the input port.

3. The method of claim 2, wherein the device battery is a first device battery and the method includes, subsequent to the controller configuring the system power state of the computing device in the sleep state:
monitoring, by the controller while the system power state of the computing device is configured in the sleep state, the input port for the coupling of one of the first device battery and a second device battery that is different than the first device battery.

4. The method of claim 1, wherein the computing device is not connected to an external power source such that the charging battery included in the computing device is the only available power source for the computing device, and wherein the sleep state prevents power from being supplied from the charging battery through the power rail to the input port and at least one other subsystem in the computing device when the input port is not coupled to a peripheral device.

5. The method of claim 4, further comprising:
preventing, by at least one subsystem in the controller, the controller from changing the system power state of the computing device multiple times in response to a single coupling of the device battery to the input port.

6. The method of claim 4, wherein the changing of the system power state of the computing device includes waking the computing device from an Advanced Configuration and Power Interface (ACPI) G3 power state that provides the sleep state to an ACPI S5 power state.

7. The method of claim 1, further comprising:
determining, by the controller, that the device battery has maintained being coupled to the input port after waking the computing device from the sleep state.

8. The method of claim 1, wherein the input port is a universal serial bus (USB) port.

9. The method of claim 1, wherein the controller, the power rail, the charging battery, and the input port are each included in a notebook-type Information Handling System (IHS).

10. The method of claim 1, wherein the device battery is included in a peripheral device.

11. A method for charging a peripheral device battery, comprising:
configuring, by a controller in a notebook-type Information Handling System (IHS) that includes a charging battery coupled to a power rail in the notebook-type IHS, a system power state of the notebook-type IHS in a sleep state in which power is not supplied from the charging battery through the power rail to a plurality of components in the notebook-type IHS;
monitoring, by the controller while the system power state of the notebook-type IHS is configured in the sleep state, for the coupling of a peripheral device to a Universal Serial Bus (USB) connector that is included in the plurality of components;
detecting, by the controller, the coupling of the peripheral device to the USB connector while the system power state of the notebook-type IHS is configured in the sleep state and the USB connector is not being supplied power from a peripheral device battery in the peripheral device; and
waking, by the controller in response to detecting the coupling of the peripheral device to the USB connector, the notebook-type IHS from the sleep state to a change the system power state of the computing device in order to causes power from the charging battery to be provided via the power rail to the USB connector to charge the peripheral device battery in the peripheral device.

12. The method of claim 11, further comprising:
detecting, by the controller, that the peripheral device has been decoupled from the USB connector; and preventing, by the controller in response to detecting that the peripheral device has been decoupled from the USB connector, power from the charging battery from being provided via the power rail to the USB connector.

13. The method of claim 12, wherein the peripheral device is a first peripheral device and the method includes, subsequent to the controller configuring the system power state of the notebook-type IHS in the sleep state:

monitoring, by the controller while the system power state of the notebook-type IHS is configured in the sleep state, the USB connector for the coupling of one of the first peripheral device and a second peripheral device that is different than the first peripheral device.

14. The method of claim 11, wherein the notebook-type IHS is not connected to an external power source such that the charging battery included in the notebook-type IHS is the only available power source for the notebook-type IHS, and wherein the sleep state prevents power from being supplied from the charging battery through the power rail to the input port and at least one other subsystem in the notebook-type IHS when the input port is not coupled to the peripheral device.

15. The method of claim 14, further comprising:

preventing, by at least one subsystem in the controller, the controller from changing the system power state of the notebook-type IHS multiple times in response to a single coupling of the peripheral device to the USB connector.

16. The method of claim 14, wherein the changing of the system power state of the notebook-type IHS includes waking the notebook-type IHS from an Advanced Configuration and Power Interface (ACPI) G3 power state that provides the sleep state to an ACPI S5 power state.

17. The method of claim 11, further comprising:

determining, by the controller, that the peripheral device has maintained being coupled to the USB connector after waking the notebook-type IHS from the sleep state.

18. The method of claim 11, further comprising:

generating, at the USB connector in response to the coupling of the peripheral device to the USB connector, a high-to-low Direct Current (DC) transition; and transforming, by a signal converter that is coupled to the USB connector, the high-to-low DC transition to a high-to-low pulse.

19. The method of claim 18, further comprising:

providing, by the signal converter, the high-to-low pulse to the controller.

20. The method of claim 19, further comprising:

recognizing, by the controller, the high-to-low pulse as a power switch input assertion.

* * * * *

UNITED STATES PATENT AND TRADEMARK OFFICE
CERTIFICATE OF CORRECTION

PATENT NO. : 12,142,961 B2
APPLICATION NO. : 17/479666
DATED : November 12, 2024
INVENTOR(S) : Fiebrich et al.

Page 1 of 1

It is certified that error appears in the above-identified patent and that said Letters Patent is hereby corrected as shown below:

In the Claims

Claim 1, Column 5, Line 54, "causes" should read --cause--

Claim 11, Column 6, Line 60, "to a change" should read --to change--

Claim 11, Column 6, Line 62, "causes" should read --cause--

Signed and Sealed this
Twenty-first Day of January, 2025

Coke Morgan Stewart
*Acting Director of the United States Patent and Trademark Office*